United States Patent
Bortolon et al.

(12) 
(10) Patent No.: US 6,437,049 B1
(45) Date of Patent: Aug. 20, 2002

(54) PROCESS FOR MODIFYING POLYPROPYLENE WITH MALEIC ANHYDRIDE

(75) Inventors: Vittorio Bortolon, Padua; Tonino Savadori, Pontelagoscuro, both of (IT)

(73) Assignee: P. Group S.r.l., Milan (IT)

( * ) Notice: Subject to any disclaimer, the term of this patent is extended or adjusted under 35 U.S.C. 154(b) by 0 days.

(21) Appl. No.: 09/793,501

(22) Filed: Feb. 27, 2001

(51) Int. Cl.7 .......................... C08L 23/12; C08F 255/02
(52) U.S. Cl. ........................ 525/240; 525/285; 525/263; 525/265; 525/273
(58) Field of Search ................................ 525/240, 285, 525/263, 265, 273

(56) References Cited

U.S. PATENT DOCUMENTS 4,395,517 A * 7/1983 Waniczek et al. ............. 525/168

FOREIGN PATENT DOCUMENTS

| DE | 275 159 | 1/1990 |
| EP | 0 457 291 | 11/1991 |

\* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

Process for the preparation of modified polypropylene which can be used as compatibilizing agent, consisting in reacting the polymer with maleic anhydride in the presence of dilaurylperoxide and in the absence of a solvent.

13 Claims, No Drawings

PROCESS FOR MODIFYING POLYPROPYLENE WITH MALEIC ANHYDRIDE

The present invention relates to a process for modifying polypropylene by means of a grafting reaction with maleic anhydride, in order to obtain a product which can be advantageously used as a compatibilizing agent in the preparation of polypropylene reinforced with glass fibers or mixed with polyamide.

It is known, for example, from the German Democratic Republic patent nr. 275,159, that it is possible to treat polypropylene with maleic anhydride in the presence of peroxide initiators in order to obtain a modified product characterized by improved mechanical properties as well as reasonable adhesion properties.

The use of various peroxide initiators however together with operating conditions which vary in relation to the initiator used, according to the disclosures deriving from the state of the art, causes the formation of products which are not completely homogeneous with each other, also characterized by a degradation degree which makes them unsuitable, or however does not guarantee constant and repeatable use, to be adopted as compatibilizing agents in the preparation of polypropylene reinforced with glass fibers.

The Applicant has now found, and this forms the object of the present invention, that if the modification reaction of polypropylene with maleic anhydride is carried out with dilaurylperoxide and is effected in a solvent-free heterogeneous phase, it is possible to obtain a modified polypropylene whose characteristics enable it to be advantageously used as a compatibilizing agent in the preparation of polypropylene reinforced with glass fiber or mixed with polyamide, without the uncertainties and unreliability described in the general disclosures deriving from the state of the art: furthermore an important factor is the low degradation observed in the products prepared in heterogeneous phase using dilaurylperoxide as radicalic initiator with respect to the products obtained with other methods and other radicalic initiators.

The present invention therefore relates to a process for the grafting of maleic anhydride on polypropylene consisting in reacting the polymer with the anhydride in heterogeneous phase and in the presence of dilaurylperoxide as radicalic initiator.

The reaction is carried out in an inert atmosphere, under nitrogen pressure, at a temperature which progressively rises to a maximum of 110° C., for times ranging from 0.5 to 3.0 h. It is finally quenched by the addition of water and, after the removal of the washing water, the product is dried under vacuum. As already mentioned, the reaction is carried out without a solvent, and the grafting yield proves to range from 1.9 to 3.2.

The Following Advantages can be Observed:
the fluidity of the polypropylene is not modified,
as there is no organic solvent, there are no disposal problems of the washing water,
the washings after the reaction are effected with water and sodium hydrate,
high value of grafted maleic anhydride,
insignificant degradation observed on the polypropylene after the reaction,
the product is still completely soluble in hot toluene showing the absence of significant branching and/or cross-linking phenomena.

Using the synthesized products as additives in the preparation of polypropylene reinforced with glass fiber, the evaluation of the physico-mechanical parameters of the end-materials had led to the conclusion that the compatibilization is, in any case, still at a good level of industrial interest.

EXAMPLE 1 (Sample 1)

400 kg of PP flakes (ELTEXP HV001) are charged into a 2 m$^3$ thermostat-regulated reactor. The reactor is kept under stirring and 3 vacuum/nitrogen cycles are effected. 40 kg of Maleic Anhydride and 12 kg of Dilauryl peroxide (Laurox-Akso) are added. The temperature is brought to 90° C. under nitrogen pressure (3 atm) and the mixture is left to react for two hours, raising the temperature to 110° C. At the end of the reaction, 1.0 m$^3$ of water are added at 80° C., which is then removed after 1 h. Another washing is effected with 0.8 m$^3$ of water at 60° C. containing 25 kg of sodium hydroxide. After 30 minutes, the washing solution is removed and the washing is continued two more times with 0.5 m$^3$ of water. After removing the washing water at 85° C., the mixture is dried under vacuum in the same reactor for 8 h.

SAMPLE 1

Total maleic anhydride 3.19% MFI (melt flow index of modified PP/melt flow index of starting PP).

EXAMPLE 2 (Sample 2)

300 gr of spherical form VALTEC HS013 PP are charged into a 2 liter thermostat-regulated reactor and kept under a stream of nitrogen for 30 minutes. 30 gr of MA and 15 gr of Dilauryl peroxide are added. The temperature is brought to 85° C. under slight nitrogen pressure and the mixture is left to react for 3 h. 900 ml of water are added at a constant temperature of 85° C., and are removed after 1 h. A further washing is effected with 600 ml of water containing 18 gr of sodium hydroxide, the temperature still being maintained at 85° C. The washing solution is removed and the washing is repeated twice with 300 ml of water. The product is recovered and dried in an oven for 8 h at 90° C. Total maleic anhydride: 1.98% Rel. MFI: 1.76.

The characterization of the samples is indicated in the following tables:

TABLE 1

Synthesis and chemical characterization

| Sample | PP (kg) | Type | MA (kg) | Perox. (kg) | MA total (%) | MFI rel |
|---|---|---|---|---|---|---|
| 1 heterog. ind. phase | 400 | flakes | 40 | 12 | 3.19 | 1.. |
| 2 heterog. lab. phase | 0.3 | spherical form | 0.03 | 0.009 | 1.59 | 1.2 |

TABLE 2

Composition of the samples, reinforced sample 1

| Component | Reference | 2A | 2B | 2C |
|---|---|---|---|---|
| PP H012 HV200 | 49 | 47.4 | 46.4 | 45.4 |
| PP H02 HL-402 | 20 | 20 | 20 | 20 |
| PP-g-MA (sample 1) | — | 1.5 | 2.5 | 3.5 |
| RFV CS 144-14C | 30 | 30 | 30 | 30 |

TABLE 2-continued

Composition of the samples, reinforced sample 1

| Component | Reference | 2A | 2B | 2C |
|---|---|---|---|---|
| MAD ZnSO3 | 0.35 | 0.35 | 0.35 | 0.35 |
| Irganox 1010 | 0.08 | 0.08 | 0.08 | 0.08 |
| Irganox PS 802 | 0.23 | 0.23 | 0.23 | 0.23 |
| Wax SP500 | 0.4 | 0.4 | 0.4 | 0.4 |
| Physico-Mechanical Characteristics | | | | |
| Tensile Kr (Mpa) | 50 | 91 | 92 | 92 |
| Tensile elongation (%) | 2 | 3 | 3 | 3 |
| Flexural modulus (Mpa) | 5400 | 6050 | 6080 | 6100 |
| Flexural strength (Mpa) | 80 | 125 | 124 | 124 |
| Notched izod 3.2 mm (J/m) | 70 | 104 | 114 | 120 |
| HDT 1.8 Mpa (° C.) | 135 | 150 | 151 | 151 |
| MFI (g/10 min) | 3 | 3.0 | 3.0 | 3.0 |

TABLE 3

Composition of the samples, reinforced sample 2

| Component | Reference | Sample 2 |
|---|---|---|
| PP VALTEC HS0013 | 100 | 95 |
| PP-g-MA (sample 2) | — | 5 |
| Glass fiber | 43 | 43 |
| Hydrotalcite | 0.05 | 0.05 |
| Irganox 1010 | 0.12 | 0.12 |
| Irganox PS802 | 0.35 | 0.35 |
| Loxiol G47 | 0.4 | 0.4 |
| ZnS | 0.3 | 0.3 |
| Physico-Mechanical Characteristics | | |
| Tensile Kr (Mpa) | 56 | 89 |
| Tensile elongation (%) | 2 | 3 |
| Flexural modulus (Mpa) | 5400 | 6050 |
| Flexural strength (Mpa) | 80 | 120 |
| Notched izod 3.2 mm (J/m) | 79 | 123 |
| HDT 1.8 Mpa (° C.) | 153 | 154 |
| VICAT 5 kg (° C.) | 116 | 140 |
| MFI (g/10 min) | 2 | 3.3 |

What is claimed is:

1. A process for the preparation of modified polypropylene consisting essentially of reacting polypropylene with maleic anhydride in the presence of dilaurylperoxide and in the absence of a solvent.

2. The process according to claim 1, wherein the reaction is effected in an inert atmosphere at a temperature of up to 110° C.

3. The process according to claim 1, wherein the reaction is carried out within a time range of 0.5 to 3 hours.

4. Polypropylene modified by grafting with maleic anhydride obtained according to the process of any one of claims 1–3.

5. A composition comprising:
   (a) polypropylene,
   (b) glass fiber or polyamide,
   (c) polypropylene modified by the process of any one of claims 1–3.

6. The composition according to claim 5, wherein polypropylene modified by the process of claim 1 has a maleic anhydride content ranging from 1.9 to 3.2% by weight.

7. The composition according to claim 5, wherein (b) is glass fiber.

8. The composition according to claim 5, wherein (b) is polyamide.

9. Polypropylene modified by grafting with maleic anhydride obtained according to the process of any one of claims 1–3, wherein the content of maleic anhydride ranges from 1.9 to 3.2% by weight.

10. A composition comprising:
    polypropylene, glass fiber or polyamide, and the modified polypropylene according to claim 4.

11. A composition comprising:
    polypropylene, glass fiber, and the modified polypropylene according to claim 4.

12. A composition comprising:
    polypropylene, polyamide, and the modified polypropylene according to claim 4.

13. A process for the preparation of modified polypropylene consisting essentially of reacting solid polypropylene with maleic anhydride in a solvent-free heterogenous phase in the presence of dilauryl peroxide.

* * * * *